United States Patent
Ito et al.

[19]

[11] Patent Number: 6,054,679
[45] Date of Patent: Apr. 25, 2000

[54] DEPOSITION METHOD OF PRODUCT MOLDED WITH THERMOPLASTIC RESIN, AND A DEPOSITING ELECTRODE TO BE USED FOR THIS DEPOSITION METHOD

[75] Inventors: Takeshi Ito; Hideaki Sakuma, both of Fukushima, Japan

[73] Assignee: Tohoku Munekata Co., Ltd., Japan

[21] Appl. No.: 09/312,211

[22] Filed: May 14, 1999

[30] Foreign Application Priority Data

May 15, 1998 [JP] Japan .................................. 10-132840

[51] Int. Cl.[7] .................................................. B29C 65/34
[52] U.S. Cl. .................... 219/245; 156/379.7; 156/273.9
[58] Field of Search ........................ 219/243; 156/379.7, 156/273.9; 53/372.3; 264/248; 425/DIG. 13

[56] References Cited

U.S. PATENT DOCUMENTS 4,040,889  8/1977  Acda ........................................ 156/498

FOREIGN PATENT DOCUMENTS 823321      2/1998   European Pat. Off. .
10-44246    2/1998   Japan .
2856352    11/1998   Japan .
10-323903  12/1998   Japan .

Primary Examiner—John A. Jeffery
Attorney, Agent, or Firm—McGlew and Tuttle, P.C.

[57] ABSTRACT

A molded product is thermally bonded mutually with another molded product by disposing the resistance heating element (20) to the bonding face of product molded with the thermoplastic resin, making the bonding electrode (10) contact the resistance heating element (20) and by impressing the voltage for its heat generation. The heat generation temperature of the resistance heating element (20) at the voltage impressed portion (21) is suppressed to the level lower than the fusion temperature of resin by blowing the cooling gas toward the voltage impressed portion (21) from a vent hole (11) provided on the bonding electrode (10).

11 Claims, 3 Drawing Sheets

Fig. 1A  Fig. 1B
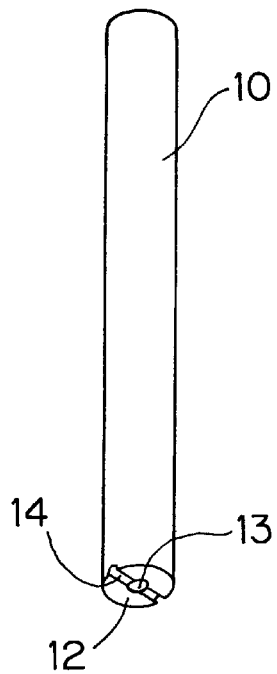
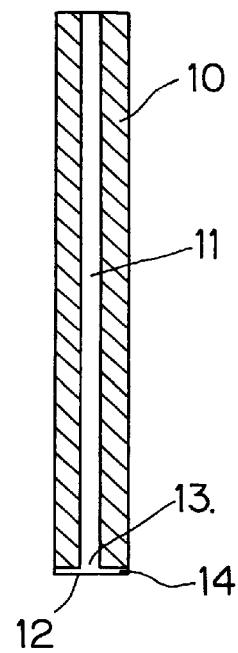
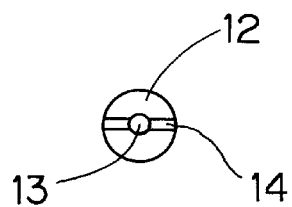
Fig. 1C
Fig. 2
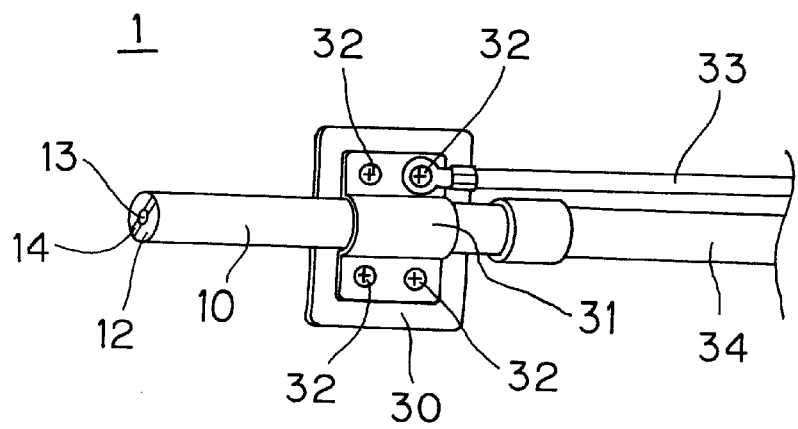

DEPOSITION METHOD OF PRODUCT MOLDED WITH THERMOPLASTIC RESIN, AND A DEPOSITING ELECTRODE TO BE USED FOR THIS DEPOSITION METHOD

FIELD OF THE INVENTION

The present invention relates to a method for fusing (melting) the resin on a molded product face and for mutually bonding the molded products to each other by disposing a resistance heating element between the fused (molten) faces of a molded part with the thermoplastic resin and by impressing the voltage to this resistance heating element for heating it, and also to the bonding electrode by making it contact the resistance heating element for this bonding and for impressing the voltage to it.

BACKGROUND OF THE INVENTION

In the case of the mutually bonding of different products that have been molded using the thermoplastic resin, the known methods utilize ultrasonic waves, high frequency electromagnetic induction or the bonding agents.

However, in these bonding methods, a great amount of cost is involved with the installation in the case of utilizing the ultrasonic waves and high frequency electro-magnetic induction. Moreover there is a problem of inducing a defective factor to be present in the electronic parts in the situation involving incorporation of these electronic parts inside the case that is a molded product. In addition, the coupling by use of the bonding method not only uses the time until it is hardening but also may cause stain due to the leakage of bonding agent from the mated faces. This can result in a defect that affects the outside appearance unfavorably.

Therefore, a variety of such methods are presented such as disposing a heating element (hereinafter to be called "Resistance Heating Element") based on the electric resistance between two molded products being bonded, and fusing the thermoplastic resin by this exothermic phenomenon to mutually bond both the molded products.

This method is practically an extremely effective bonding method because a simple installation is available without exerting any influence on the internal parts and the outside appearance since this method is the bonding by use of instantaneous heat.

As the method for impressing the voltage to the resistance heating element in the bonding method in general includes inducing the resistance heating element from the molded product to form the voltage impressed portion and butting the electrode against this voltage impressed portion.

These kinds of voltage impression methods are disclosed by this patent applicant in Japanese Patent Application No. H8-209647, Japanese Patent Application No. H8-280435, Japanese Patent Application No. H9-136627 and others. These impression methods are the methods of previously providing on the molded product the electrode inserting hole reaching the resistance heating element caught between the bonding faces of the molded product, inserting the electrode into this inserting hole to have it contact the resistance heating element and impressing the voltage to bond it. According to this method, the resistance heating element cannot be seen from the outside, which can act to enhance the sealing property.

In this way, the bonding method using the resistance heating element is an excellent method, but has the problems as follows:

For making the bonding electrode contact with the resistance heating element for securely impressing the voltage, an adequate push force needs to be applied on the electrode. For example, in case of the bonding machine fabricated by the inventor of this invention, the push pressure of 3 N/mm$^2$ is applied on the electrode.

Therefore, when the resistance heating element gets heated up to fuse the surrounding resin, the resistance heating element at the portion to which the push pressure is applied to the bonding electrode gets buried sometimes into the fused resin or the receptacle portion abnormally deformed. Furthermore, because the pressure impressed portion of the resistance heating element gets softened and deformed by the heat generation, the contact defect with the electrode is caused failing to obtain the satisfactory bonding.

For this reason, it is important in the heat bonding method using an electrode that the heat generation should be suppressed in the voltage impressed portion even if the resistance heating element should generate the heat so that the position and shape of voltage impressed portion may not get deformed.

Therefore, in the past, such a steps are taken, in the mounted portion of voltage impressed portion of resistance heating element with which the electrode comes in contact, as increasing more the wall thickness of resin more than that of the other mounted portions, and as adjusting the delicate balance between the fusion time and the push pressure of electrode in addition to the molded product structural measure of the addition, etc. of a holding rib so that the mounted portion may not get deformed.

However, as to increasing the wall thickness of the resin and the structure of a holding rib, there may arise the situation such that the steps cannot be taken due to structural problems like the parts and internal shape, etc. being incorporated into the molded product. Also, if the wall thickness of molded product should be thin, the product face which is the rear face of the voltage impressed portion of resistance heating element tends to slightly heap up when other molded product thermally bonded to the rear face by such reasons as the voltage impressed portion of resistance heating element gets heated up higher than the other portions attributable to the push pressure of a bonding electrode and the contact resistance. Especially in case of the product face that has been coated with luster paint, this heap-up phenomenon appears conspicuously in some cases and the product cannot be satisfactorily accepted in view of its design.

SUMMARY AND OBJECTS OF THE INVENTION

The object of this invention is to provide a bonding method which requires no mounting structure of any special resistance heating element and moreover where the voltage can be impressed securely to the resistance heating element even without conducting the balance adjustment between the fusion time and the push pressure and moreover in the product face, where the bonded face does not appear and that can be satisfied in respect of its design.

It is a further object of the invention to provide an electrode to be used to with the bonding method according to the invention.

According to the invention, a bonding method is provided for a product being molded with the thermoplastic resin for mutually bonding the molded products to each other by applying or disposing a resistance heating element between the molded faces of the the thermoplastic resin molded product. The bonding electrode is made to touch with the resistance heating element. A voltage is impressed on the element for heating the resistance heating element. The bonding method is made while blowing cooling gas in the vicinity of the voltage-impressed portion to which the bonding electrode and the resistance heating element get are in contact with during the voltage impression.

The cooling gas may be air or an inactive gas such as an inert gas. The cooling gas may be gas which is at an ordinary temperature (e.g., room temperature or the prevailing temperature) or the gas may be cooled down to a temperature lower than the ordinary temperature. The inactive gas may be a nitrogen-based gas. The cooling gas may be blown to or blown over the voltage-impressed portion via the area inside the bonding electrode.

A cooling gas injection nozzle may be arranged adjacent to the voltage-impressed portion and the cooling gas may be injected from this nozzle to the voltage-impressed portion.

According to another aspect of the invention, a thermally bonding electrode is provided for a product molded from a thermoplastic resin. The bonding electrode is to be used for the heat bonding of the product being molded with the thermoplastic resin mutually bonding the molded product to each other by disposing a resistance heating element between the bonding faces of product being molded. The bonding electrode is made to contact the resistance heating element and a voltage is impressed for heating the resistance heating element. Cooling gas can be blown up to the voltage-impressed portion in which the bonding electrode and the resistance heating element are in contact via a vent hole during the voltage impression. This is done by providing the bonding electrode with a rod shape and moreover providing vent holes inside this rod. This vent hole is open to the contact face of the bonding electrode.

A groove may be provided in such a manner that a part of the cooling gas comes via the vent hole and may be diffused in a lateral or side direction and may be injected to the contact face of the electrode.

A resistance heating element is caught or disposed between the fused face of the thermoplastic resin molded product. The bonding electrode contacts the resistance heating element and the applicable resistance heating element is heated up by applying a voltage according to a thermoplastic resin molded product heat bonding method. Thereby, the voltage-impressed portion is cooled down while spraying cooling gas on the voltage-impressed portion where the bonding electrode comes in contact with the resistance heating element in the heat bonding method for mutually bonding the molded products with each other.

The cooling gas is air or an inactive gas. In the heat bonding method according to the invention, nitrogen gas ($N_2$) can be used, for example, as the air or inactive gas. Further, this cooling gas may be at the ordinary temperature but it is also acceptable to use the gas which has been cooled down below the ordinary temperature in advance.

Next, as the means for spraying the cooling gas to the voltage impressed portion, the electrode may be provided with a rod shape, to provide a vent hole in the axial direction of this electrode for inducing the gas being supplied from the cooling gas supply source up to the contact face of the electrode via the vent hole and to spray the gas therefrom. The resistance heating element and resin may be prevented from getting deformed with the force of pushing the electrode by arranging the injection nozzle adjacent to the voltage-impressed portion with which the electrode gets in contact, injecting the cooling gas from this nozzle toward the voltage-impressed portion and then suppressing the heat generation of the resistance heating element in the voltage-impressed portion and by suppressing the fusion of the resin.

According to the invention, the resistance heating element is caught between the fusion faces of the thermoplastic resin molded product in the heat bonding electrode of the thermoplastic resin molded product. The bonding electrode is made to contact with the resistance heating element and then the voltage is impressed for making the applicable resistance heating element heat up. This bonding electrode is formed to have a rod shape. The bonding electrode is used to the heat bonding of the thermoplastic resin molded product, which mutually bonds the molded products with each other. A vent hole is provided inside the bonding electrode of this rod shape. Additionally, this vent hole is also opened to the contact face of a bonding electrode so that thereby the cooling gas can be blown to the voltage impressed portion where the bonding electrode gets in contact with the resistance heating element via the vent hole during the voltage impression.

In this electrode, the electrode is formed to a rod shape and the vent hole is provided inside the electrode of this rod shape and in the axial direction. This vent hole is opened in the contact face, and the cooling gas is injected toward the voltage-impressed portion therefrom. At this time, it may also be acceptable to form a groove on the contact face for diffusing a part of cooling gas in the circumferential direction, or to expand more or less the diameter of the opened portion of the vent hole into the taper shape.

The resistance heating element itself and the resin of the voltage-impressed portion are prevented from generating the heat or being heated up more than necessary and from getting thermally deformed by spraying the cooling gas to the portion where the voltage impressing electrode gets in touch with the resistance heating element.

This is to be explained in more detail with reference to the invention described herein. The electrode to be bonded is made to contact the resistance heating element, and the cooling gas is sprayed onto the resistance heating element simultaneously when the voltage is impressed. As a result, because the voltage-impressed portion of the resistance heating element is cooled down by the cooling gas and the heat generation can be suppressed to the level lower than the resin softening temperature, the resin in its periphery is prevented from getting fused, and even if the push pressure of the electrode should be added, the product is prevented from getting deformed abnormally. For this reason, there is no need for further increasing the wall thickness of resin structure of voltage impressed portion then the other portions, and for thinking about such a reinforcement means as adding the holding rib, and thus the stable contact status between the electrode and the resistance heating element can be obtained.

The cooling gas is to be injected to the contact face between the electrode and the resistance heating element from the vent hole or injection nozzle inside the electrode. Because a part of cooling gas diffuses to the side direction via the groove and cools down the contact portion as if it surrounds the portion, the effect of further enhancing the cooling effect can be obtained. Forming the groove in this way is effective especially when the resistance heating element is a flat face shape.

In addition, if the bonding electrode of the invention is used, it is possible to blow the cooling gas to the resistance heating element from the vent hole of a bonding electrode while applying the voltage to the resistance heating element. For this reason, the temperature of the resin in the voltage-impressed portion does not reach the level higher than the fusion temperature, and the product will not get abnormally deformed even if the push pressure of the electrode should be added. For this reason, there is no need for relating such reinforcement to an increase in the wall thickness of the structure of the resin in the voltage-impressed portion more than that of other portions or as adding the holding rib. In this way, the stable contact status between the electrode and the resistance heating element can be obtained. Further, in the molded product to be bonded, it is possible to obtain the bonding method where the influence of an upsurge due to the voltage impression does not appear to the rear face of voltage impressed portion.

Because the bonding electrode of this invention makes it possible to blow the cooling gas to the voltage-impressed portion while contacting the resistance heating element caught between the bonding faces of the thermoplastic resin molded product, only the temperature of voltage-impressed portion does not reach the fusion temperature even if the resistance heating element should generate the heat. The resin is prevented from being deformed even if the push pressure added by the push pressure adjusting mechanism should be applied on the voltage-impressed portion of the resistance heating element.

Furthermore, the cooling effect is enhanced for releasing the cooling gas to the outside while diffusing it after spraying the gas by forming the groove on the contact face of the electrode, and additionally the cooling efficiency is adjusted by adjusting the flow rate of cooling gas.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1A is a perspective view of the bonding electrode according to the invention;

FIG. 1B is a cross sectional view of the electrode of FIG. 1B;

FIG. 1C is a front view of the electrode of FIG. 1A;

FIG. 2 is a perspective assembly completion view of an electrode block;

DESCRIPTION OF THE PREFERRED EMBODIMENTS

Figure 3:
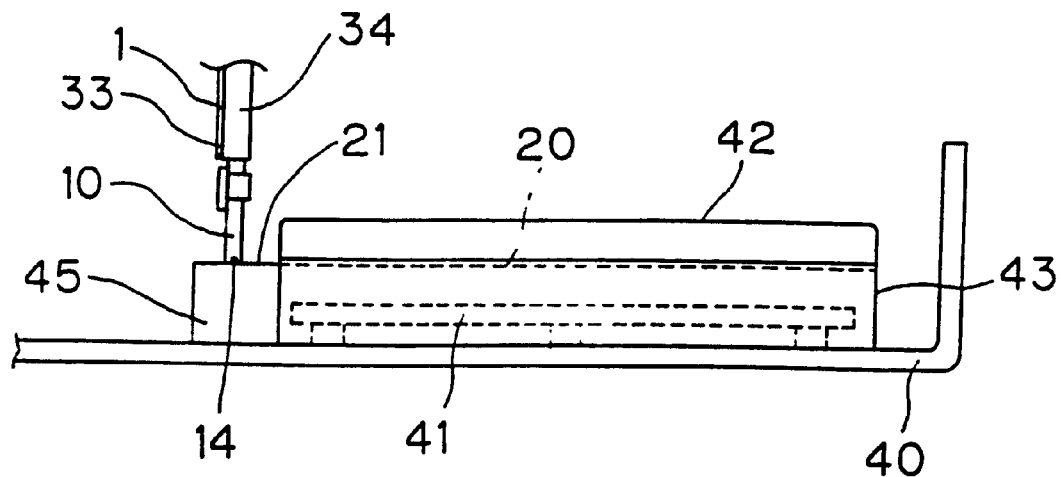
FIG. 3 is a side view showing aspects of the thermal bonding process with according to a first embodiment.

Referring to the drawings in particular, FIG. 1A is an overall view of a bonding electrode 10. FIG. 1B is a cross sectional view of a bonding electrode 10 and FIG. 1C is a plan view looking from the contact face 12 the bonding electrode 10. The material of a bonding electrode 10 in the present embodiment uses a copper rod of 3 mm diameter, and a vent hole 11 with a diameter of 1 mm is formed toward the axial direction at its center. As the material of the bonding electrode 10, there is no need for using only copper so long as the material is of high conductivity and of high abrasion resistance.

The groove 14 for exhausting to the outside the cooling gas injected from the opening 13 of vent hole 11 is provided to the contact face 12 where the bonding electrode 10 gets in touch with the resistance heating element 20. Especially in case that the resistance heating element 20 is of flat plate, the groove 14 becomes the effective structure for enhancing the cooling effect. The contact property goes up moreover if the contact face 12 should be shaped to the concave portion into which the resistance heating element 20 can be accommodated in line with the outside circumference shape of the resistance heating element 20.

FIG. 2 indicates the electrode block 1 where the bonding electrode 10 has been mounted on the mounting plate 30 combining the use of insulation. The mounting of the mounting plate 30 is by way of tightening the mounting metal fitting 31 with the screw 32 using a ring-shaped mounting metal fitting 31 surrounding the outside circumference of a bonding electrode 10. The mounting metal fitting 31 and the bonding electrode 10 directly contact each other for making it possible for electric current to flow, and moreover to tighten together the electric wires 33, supplying the voltage to a part of plural screws 32. Thus, the parts enable the bonding electrode 10 to impress the voltage.

The tube 34 guiding the cooling gas to the vent hole 11 is fitted to the other end portion of the bonding electrode 10. Further, the other end of this tube 34 is connected to the supply source of the cooling gas via an electromagnetic valve for opening/closing the flow rate adjusting throttle valve (not shown in the figure) and the cooling gas.

Figure 4:
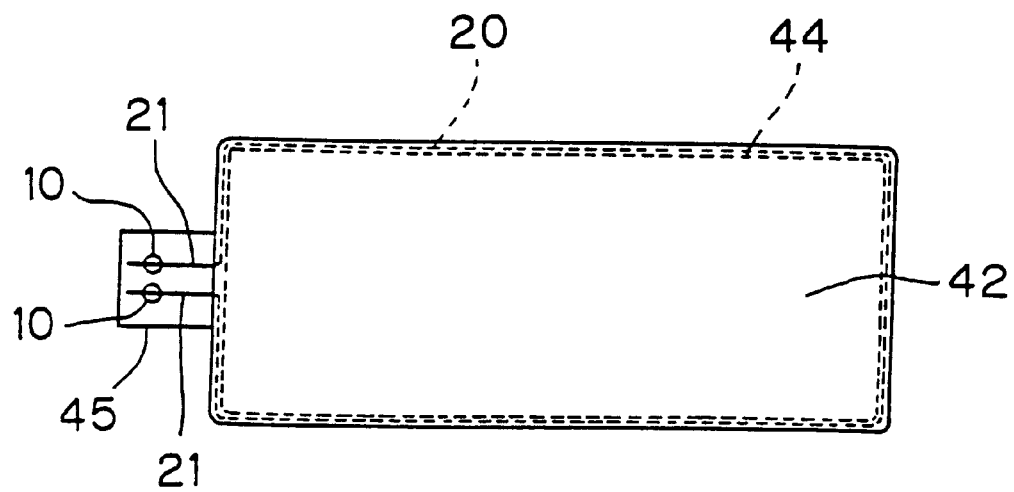
FIG. 4 is a plan view of the features of the embodiment of FIG. 3.

A first embodiment of the method is shown in FIGS. 3 through 5. This method makes the bonding electrode 10 of this invention contact with the voltage impressed portion 21 of resistance heating element 20 protruding out of the substance to be bonded, using the electrode 1 provided with this Embodiment.

FIG. 3 is an explanatory view of a cover 42 mounted to an electric circuit 41 for its protection for heat bonding use. The cover 42 is mounted after assembling the electric circuit 41 to a part of a case body 40. The case body 40 is molded with polycarbonate (PC) that is the thermoplastic resin.

A rib 43 is integrally molded with the case body 40 as if it surrounds the electric circuit 41. The rib 43 is provided around the circumference of electric circuit 41. Moreover an annulus groove 44 receiving the resistance heating element 20 is shaped on the bonding face that is the top face of rib 43. A receptacle base 45, for holding the voltage impressed portion 21 of resistance heating element 2, is provided adjacent to the outside of the rib 43.

During the bonding, the resistance heating element 20 is fitted into the annular groove 44. The voltage impressed portions 21 that are the ends of resistance heating element 20 are assembled in such that they may protrude outside the cover 42 to the top face of receptacle base 45. And then the annular rib (not shown in the figure) that was shaped on the joint face of cover 42 is fitted into the said annular groove 44. FIG. 4 shows the plain view looking the cover 42 from the top face.

Next, the bonding electrode 10 of two electrode blocks 1 shown in Embodiment 1, contacts with the voltage impressed portion 21 of resistance heating element 20. At this time, the push pressure of some $3N/mm^2$ is applied to the resistance heating element 20 for enhancing the contact between the resistance heating element 20 and the bonding electrode 10. The push pressure is applied separately with an adequate force by use of the push plate so that the joint faces of cover 42 and rib 43 may be fused and closely adhere toward the bottom face of case body 40.

Simultaneously when the AC12V is impressed between the electric wires 33 connected to two electrode blocks 1 with the above mentioned status being maintained, the electro-magnetic valve is opened for sending to a tube 34 the cooling gas via the throttle valve regulating the flow rate to an adequate level, and also for blowing it to the resistance heating element 20 from the opening 13 through the vent hole 11 of the bonding electrode 10. In the present embodiment, the cooling gas is set to the flow rate of 30 liters ($m^3$) per second.

Figure 5A:
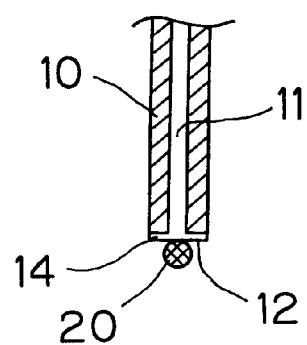
FIG. 5A is an expanded cross sectional view showing the bonding electrode in contact with the voltage-impressed portion of the resistance heating element.
Figure 5B:
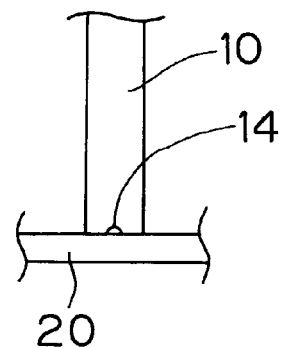
FIG. 5B is an exterior front view showing the bonding electrode in contact with the voltage-impressed portion of the resistance heating element.

FIG. 5A shows the expanded cross sectional view of the contact portion between the bonding electrode 10 and the resistance heating element 20 while FIG. 5B shows the outside appearance view. The cooling gas which has been injected from the opening 13 of vent hole 11 is exhausted from the gap between the groove 14 and the contact face 12 and between the resistance exothermic bodies 20 arranged on the contact face 12 while cooling down the resistance exothermic bodies 20.

After the stipulated time has passed since the impression of voltage for 4.0 seconds, the impression of voltage is stopped and at the same time the cooling gas is also stopped by use of the electromagnetic valve.

As a result, the temperature for the receptacle base 45 and the resistance heating element 20, in touch with each other, proved to be lower than 100° C. due to the effect of the cooling gas flow. This temperature is suppressed lower than 140° C. which is the thermal deformation temperature of polycarbonate resin (PC). Thereby, the receptacle base 45 is not deformed and the contact between the bonding electrode 10 and the resistance heating element 20 could be securely conducted.

The thermal bonding was conducted using the same electrode block 1 as that in the second embodiment and the same case body 40 as that molded with the thermoplastic resin. However, in the comparison example, the blowing of the cooling gas was not conducted during the voltage impression. As a result, the receptacle base 45 got deformed by the heat, the resistance heating element 20 got bent by the push pressure of electrode block 1, and finally the bonding electrode 10 got separated from the resistance heating element 20, resulting in the impossibility of voltage impression. Therefore, the bonding could not be completely achieved, and the satisfactory bonding strength could not be obtained.

As the means for preventing the harmful influence to the outside appearance of product attributable to the heat bonding after thermally bonding the molded product, the third embodiment introduces the heat bonding method using the bonding electrode according to the present invention.

In recent years, the use of molded products for the exterior of an automobile has increased. This facilitates making the automobile lighter in weight.

Figure 6:
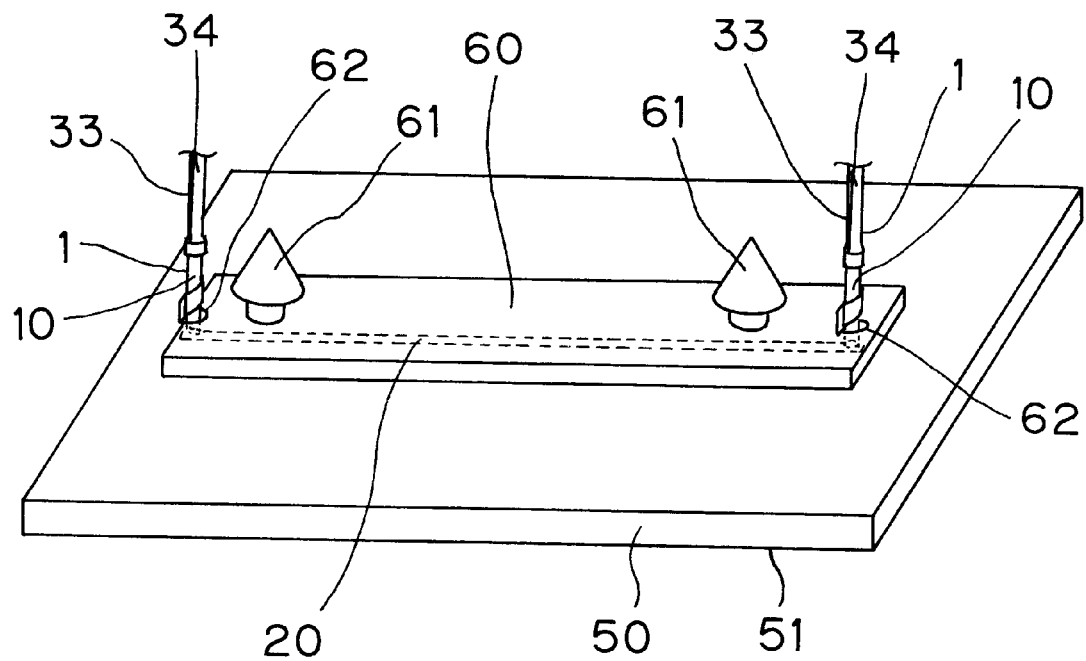
FIG. 6 is a perspective view showing features of a thermal bonding process according to a second embodiment.

FIG. 6 is an explanatory view of features of the method for thermally bonding using the resistance heating element 20. The reinforcement plate 60 is made of polypropylene that has integrally molded the hooks 61 for mounting to the reinforcement and to the car body to the molded product for an exterior 50. This method uses the polypropylene resin. For enhancing the design property, the lustrous coating has been applied to the product face 51 of molded part 50 for exterior.

If the temperature on the rear face should become higher than necessary due to the thermal bonding during the molded product bonding as mentioned above, there is such a case that the product face gets swollen. Especially if the luster treatment has been provided on the product face 51, this swelling can be conspicuously seen. The asthetic nature of the features cannot be obtained in respect of the design.

For its countermeasure, the problem can be solved if the bonding electrode 10 according to this invention should be used.

The bonding method uses the insertion hole 62 for previously inserting the bonding electrode 10 into the reinforcement plate 60. This hole 62 is bored in the vicinity of both the ends of resistance heating element 20. The insertion hole 62 should preferably be the size where the cooling gas being blown out of the bonding electrode 10 can be exhausted to the outside.

First, after disposing the resistance heating element 20 between the molded product for exterior 50 and the reinforcement plate 60, the bonding electrode 10 of electrode block 1 according to this invention shall be made to contact with each resistance heating element 20 while pressurizing the reinforcement plate 60 with an appropriate force. Next, the voltage is not only applied from the electric wire 33 but the cooling gas is also supplied to the bonding electrode 10 from the tube 34 and blown to the voltage impressed portion 21 of resistance heating element 20.

After the lapse of a stipulated period of bonding time, the voltage impression is not only stopped but also the supply of the cooling gas is stopped.

When the above mentioned bonding process is completed, the status of the product face 51 may be checked (that there was no heating influence on to the rear face). The process provides a molded product with an exterior 50 that satisfies the aesthetic design requirements.

In addition to the above mentioned embodiments, the bonding electrode according to this invention can optionally control the temperature rise of voltage impressed portion of resistance heating element by changing the flow rate of the cooling gas to be blown from the vent hole. In addition, because the cooling gas is blown out, this embodiment also has such an effect as removing the unnecessary things such as refuse, etc. adhering to the voltage-impressed portion. For reference, though the cooling gas has been stopped together with the stop of voltage impression in this embodiment, the effect can be increased more in case of the second embodiment if the blowing should be continued for a short time after the stop of voltage impression.

Air is used as the cooling gas in the said embodiment, but it is also possible to use an inactive gas ($N_2$) instead of the air, or the gas that has been cooled down lower than the ordinary temperature. Further, such a means can be imagined as arranging the injection nozzle adjacent to the voltage-impressed portion and injecting the cooling gas therefrom for cooling.

The thermal bonding using the bonding method and the electrode relating to this invention avoids suppresses the temperature rise of the voltage-impressed portion, that becomes highest in the heat generation temperature in the resistance heating element. The cooling gas being blown from the vent hole or nozzle shaped on the bonding electrode achieves this suppression to the level lower than the resin fusion temperature. The effects as follows can be obtained:

1. Because the resin of the voltage-impressed portion in the resistance heating element does not get fused, the shape of voltage impressed portion does not get deformed during the voltage impression, and the contact between the resistance heating element and the bonding electrode can be achieved securely.

2. Because the resin of voltage impressed portion in the resistance heating element doesn't get fused, the structure design can be done easily.

3. The influence due to the thermal bonding does not appear at the product face of molded product, and the thermal bonding with excellent aspects as to the design can be obtained.

4. The temperature rise of the voltage-impressed portion can be controlled by the adjustment of flow rate and temperature of the cooling gas.

5. Because the refuses adhered to the resistance heating element can be removed by the cooling gas, the contact defect of electrode can be prevented.

6. Because the cooling gas passes through the interior of the bonding electrode, the bonding electrode itself can also be cooled down and the stable thermal bonding can be obtained without any temperature rise in the bonding electrode even in the bonding work cycle for a short time.

While specific embodiments of the invention have been shown and described in detail to illustrate the application of the principles of the invention, it will be understood that the invention may be embodied otherwise without departing from such principles.

What is claimed is:

1. A thermally bonding electrode for a thermoplastic resin molded product for use with a bonding process, the electrode comprising:

a resistance heating element to be positioned between the bonding faces of a thermoplastic resin molded product;

a voltage application device for impressing a voltage on a voltage impressed portion of the heating element;

a gas passage formed in a vent hole of a rod part of said heating element, said vent hole being provided inside said rod part.

2. A thermally bonding electrode according to claim 1, wherein a groove is provided in said heating element in such a manner that a part of the cooling gas issues via the vent hole and may be diffused in a side direction and may be injected to the contact face of electrode.

3. A thermoplastic resin molded product bonding method, comprising the steps of:

mutually bonding molded products to each other by applying a resistance heating element between the molded faces of molded products and making a bonding electrode directly contact the resistance heating element;

heating the resistance heating element by impressing a voltage on a voltage-impressed portion of the resistance heating element;

blowing a cooling gas to the voltage impressed portion to which said bonding electrode and said resistance heating element directly contact each other during the voltage impression.

4. A bonding method according to claim 3, wherein said cooling gas is air or an inactive gas.

5. A bonding method according to claim 4, wherein said inactive gas is a nitrogen gas.

6. A bonding method according to claim 4, wherein said cooling gas is blown to said voltage-impressed portion via an area defined inside said bonding electrode.

7. A bonding method according to claim 3, wherein said cooling gas is at a prevailing temperature.

8. A bonding method according to claim 7, wherein said gas is a nitrogen gas.

9. A bonding method according to claim 3, wherein said cooling gas is cooled down to a temperature lower than said prevailing temperature.

10. A bonding method according to claim 3, wherein said cooling gas is blown to said voltage-impressed portion via an area defined inside said bonding electrode.

11. A bonding method according to claim 3, wherein said cooling gas is injected via an injection nozzle arranged adjacent to said voltage-impressed portion and the cooling gas is injected from this nozzle to said voltage-impressed portion.

* * * * *